(12) United States Patent
Rin et al.

(10) Patent No.: US 9,307,189 B2
(45) Date of Patent: Apr. 5, 2016

(54) RELAY APPARATUS CONTROLLING SIGNAL CHANNEL SELECTION

(75) Inventors: Yasuhiro Rin, Kanagawa (JP); Takeshi Hashimoto, Kanagawa (JP); Yoshiyuki Shimizu, Kanagawa (JP); Satoshi Saitoh, Kanagawa (JP); Shinichiro Kinoshita, Kanagawa (JP); Tomoo Nishigaki, Kanagawa (JP)

(73) Assignee: PIONEER DIGITAL DESIGN AND MANUFACTURING CORPORATION, Kanagawa (JP)

( * ) Notice: Subject to any disclaimer, the term of this patent is extended or adjusted under 35 U.S.C. 154(b) by 0 days.

(21) Appl. No.: 14/400,041

(22) PCT Filed: May 11, 2012

(86) PCT No.: PCT/JP2012/062187
§ 371 (c)(1),
(2), (4) Date: Nov. 10, 2014

(87) PCT Pub. No.: WO2013/168288
PCT Pub. Date: Nov. 14, 2013

(65) Prior Publication Data
US 2015/0156451 A1    Jun. 4, 2015

(51) Int. Cl.
*H04N 5/268*    (2006.01)
*H04N 7/10*    (2006.01)
(Continued)

(52) U.S. Cl.
CPC ............... *H04N 7/10* (2013.01); *G09G 5/006* (2013.01); *H04N 5/765* (2013.01);
(Continued)

(58) Field of Classification Search
CPC .................................. H04N 7/16; H04N 5/268
See application file for complete search history.

(56) References Cited

U.S. PATENT DOCUMENTS

| 2009/0244391 | A1* | 10/2009 | Kitami | H04N 5/4401 348/705 |
| 2010/0157169 | A1* | 6/2010 | Yoshida | G08C 23/04 348/734 |

(Continued)

FOREIGN PATENT DOCUMENTS

| JP | 2008-177935 | 7/2008 |
| JP | 2008-283469 | 11/2008 |

(Continued)

OTHER PUBLICATIONS

International Search Report—PCT/JP2012/062187—Jun. 19, 2012.
(Continued)

*Primary Examiner* — Jefferey Harold
*Assistant Examiner* — Samira Monshi
(74) *Attorney, Agent, or Firm* — Young & Thompson (57) ABSTRACT

A relay apparatus (10) is provided with: an image output unit (11); switches (SWa, SWb); a control unit (16) for controlling switches; and an obtaining unit (16) for obtaining a first CEC address associated with the relay apparatus if the relay apparatus is connected to an output apparatus (30). The control unit controls switches to select a signal channel connecting a first signal transmitting device (14) and a storage apparatus (20) if the first CEC address and a reproduction command are received. After connecting the relay apparatus and a unit (40), the control unit controls switches to select the signal channel connecting the first signal transmitting device and a second signal transmitting device (15) if the unit is in a video output state, and controls switches to select the signal channel connecting the first signal transmitting device and the image output unit if the unit is in a standby state.

4 Claims, 6 Drawing Sheets

(51) Int. Cl.
  *H04N 5/765* (2006.01)
  *H04N 21/4363* (2011.01)
  *G09G 5/00* (2006.01)
  *H04N 21/41* (2011.01)

(52) U.S. Cl.
  CPC .... *H04N 21/4122* (2013.01); *H04N 21/43632* (2013.01); *G09G 2370/06* (2013.01); *G09G 2370/12* (2013.01); *G09G 2370/20* (2013.01)

(56) References Cited

U.S. PATENT DOCUMENTS

2011/0242415 A1* 10/2011 Wakabayashi ............ G06F 3/14
  348/554

2012/0320275 A1* 12/2012 Sasaki .................... H04N 5/765
  348/705

FOREIGN PATENT DOCUMENTS

JP  2011-139411  7/2011
JP  2011-217126  10/2011

OTHER PUBLICATIONS

'IT Keyword 38 MHL (Mobile-High-Definition Link)', Computerworld, May 1, 2008, vol. 5, No. 5, p. 118.

IT Keyword 38 MHL (Mobile-High-Definition Link), Computerworld, May 1, 2008, vol. 5, No. 5, 2 pgs.

* cited by examiner

RELAY APPARATUS CONTROLLING SIGNAL CHANNEL SELECTION

TECHNICAL FIELD

The present invention relates to a relay apparatus which is disposed between a display apparatus such as, for example, a liquid crystal display and, for example, a reproducing apparatus or a recording apparatus, and which is configured to relay a digital signal associated with, for example, video, audio, or the like.

BACKGROUND ART

As this type of apparatus, there is proposed an apparatus configured to transmit, for example, to a unit compliant with a high-definition multimedia interface (HDMI) standard and having a HDMI terminal which allows connection of a HDMI cable thereto, a control command conforming to consumer electronics control (CEC) of the HDMI standard via the HDMI terminal, thereby performing switching control of a switch configured to switch between the HDMI terminal of the unit and a terminal noncompliant with the HDMI standard (refer to Patent literature 1).

CITATION LIST

Patent Literature

Patent Literature 1: Japanese Patent Application Laid Open No. 2011-217126

SUMMARY OF INVENTION

Technical Problem

If, for example, the reproducing apparatus is connected to this type of apparatus and the reproducing apparatus is in a standby state, no signal is transmitted to the display apparatus such as, for example, a liquid crystal display (or it is in a no-signal state), which is technically problematic.

In view of the aforementioned problem, it is therefore an object of the present invention to provide a relay apparatus configured to prevent the no-signal state even if a unit such as, for example, the reproducing apparatus connected to the relay apparatus is in the standby state.

Solution to Problem

The above object of the present invention can be achieved by a relay apparatus is provided with: a first signal transmitting device compliant with a HDMI standard; a second signal transmitting device compliant with another standard which is different from the HDMI standard, and a storage apparatus, wherein said relay apparatus is provided with: an image output unit configured to output a predetermined image; a switch configured to switch between a signal channel connecting the first signal transmitting device and the storage apparatus, a signal change connecting the first signal transmitting device and the image output unit, and a signal channel connecting the first signal transmitting device and the second signal transmitting device; a control unit configured to control the switch; and an obtaining unit configured to obtain a first consumer electronic control (CEC) address which is a CEC address associated with said relay apparatus if said relay apparatus and an output apparatus are connected to each other via the first signal transmitting device, and the control unit controls the switch to select the signal channel connecting the first signal transmitting device and the storage apparatus if the first CEC address outputted from the output apparatus and a reproduction command are received, the obtaining unit obtains a second CEC address which is a CEC address associated with a unit compliant with the another standard if said relay apparatus is connected to the unit via the second signal transmitting device, and the control unit controls the switch to select the signal channel connecting the first signal transmitting device and the second signal transmitting device if the unit is in a video output state, and controls the switch to select the signal channel connecting the first signal transmitting device and the image output unit if the unit is in a standby state.

The operation and other advantages of the present invention will become more apparent from an embodiment explained below.

DESCRIPTION OF EMBODIMENTS

An embodiment of the relay apparatus of the present invention will be explained.

The relay apparatus in the embodiment is a relay apparatus is provided with: a first signal transmitting device compliant with a HDMI standard; a second signal transmitting device compliant with another standard which is different from the HDMI standard, and a storage apparatus, wherein said relay apparatus is provided with: an image output unit configured to output a predetermined image; a switch configured to switch between a signal channel connecting the first signal transmitting device and the storage apparatus, a signal change connecting the first signal transmitting device and the image output unit, and a signal channel connecting the first signal transmitting device and the second signal transmitting device; a control unit configured to control the switch; and an obtaining unit configured to obtain a first consumer electronic control (CEC) address which is a CEC address associated with said relay apparatus if said relay apparatus and an output apparatus are connected to each other via the first signal transmitting device, and the control unit controls the switch to select the signal channel connecting the first signal transmitting device and the storage apparatus if the first CEC address outputted from the output apparatus and a reproduction command are received, the obtaining unit obtains a second CEC address which is a CEC address associated with a unit compliant with the another standard if said relay apparatus is connected to the unit via the second signal transmitting device, and the control unit controls the switch to select the signal channel connecting the first signal transmitting device and the second signal transmitting device if the unit is in a video output state, and controls the switch to select the signal channel connecting the first signal transmitting device and the image output unit if the unit is in a standby state.

The relay apparatus in the embodiment is provided with: the first signal transmitting device compliant with the HDMI standard; and the second signal transmitting device compliant with the another standard which is different from the HDMI standard such as, for example, a mobile high-definition link (MHL) standard. The relay apparatus is also provided with the storage apparatus such as, for example, a hard disk drive. The storage apparatus may be built in a case or housing of the relay apparatus, or may be disposed outside the case or housing of the relay apparatus.

The relay apparatus is further provided with the image output unit, the switch, the control unit, and the obtaining unit. The image output unit is configured to output the predetermined image. The switch is configured to switch between (i) the signal channel connecting the first signal transmitting device and the storage apparatus, (ii) the signal change connecting the first signal transmitting device and the image output unit, and (iii) the signal channel connecting the first signal transmitting device and the second signal transmitting device. The control unit, which is provided, for example, with a memory, a processor, and the like, controls the switch.

The obtaining unit, which is provided, for example, with a memory, a processor, and the like, obtains the first CEC address which is the CEC address associated with the relay apparatus if the relay apparatus and the output apparatus such as, for example, a liquid crystal display and a projector are connected to each other via the first signal transmitting device. Due to the assignment of the first CEC address, the output apparatus and the relay apparatus can cooperate. The obtaining device stores the obtained first CEC address, for example, in a RAM or the like.

If the relay apparatus and the output apparatus are connected, and if a signal including the first CEC address outputted from the output apparatus and the reproduction command to the relay apparatus is received, the control unit controls the switch to select the signal channel connecting the first signal transmitting device and the storage apparatus. As a result, for example, video content stored in the storage apparatus is reproduced, and video associated with the reproduced video content is displayed on the output apparatus.

If the relay apparatus is connected to the unit compliant with the another standard such as, for example, a reproducing apparatus and a mobile phone via the second signal transmitting device, the obtaining unit obtains the second CEC address which is the CEC address associated with the unit. Due to the assignment of the second CEC address to the unit compliant with the another standard (i.e. noncompliant with CEC), it is possible to treat the unit as a virtual unit compliant with CEC.

If the relay apparatus is connected to the unit compliant with the another standard, and if the unit is in the video output state (or start state), the control unit controls the switch to select the signal channel connecting the first signal transmitting device and the second signal transmitting device. On the other hand, if the relay apparatus is connected to the unit compliant with the another standard, and if the unit is in the standby state, the control unit controls the switch to select the signal channel connecting the first signal transmitting device and the image output unit.

As described above, the switch is controlled by the control unit to select the signal channel connecting the first signal transmitting device and the image output unit if the unit connected to the relay apparatus is in the standby state. Thus, the predetermined image outputted from the image output unit is displayed on the output apparatus. As a result, even if the unit connected to the relay apparatus is in the standby state, it is possible to prevent the no-signal state.

In one aspect of the relay apparatus in the embodiment, further comprising a converting device configured to convert the received command such that the received command is compliant with the another standard if the second CEC address outputted from the output apparatus and a command are received.

According to this aspect, it is possible to operate the unit compliant with the another standard, from the output apparatus via the relay apparatus, which is extremely useful in practice.

In another aspect of the relay apparatus in the embodiment, further comprising a starting device configured to set the unit in a start state if the unit is in the standby state and if the second CEC address outputted from the output apparatus and a command are received.

According to this aspect, it is possible to start the unit compliant with the another standard, from the output apparatus via the relay apparatus, which is extremely useful in practice.

In another aspect of the relay apparatus in the embodiment, the image output unit changes an icon displayed on a display unit of the output apparatus according to a state of the unit, if the signal channel connecting the first signal transmitting device and the image output unit is selected by the switch.

According to this aspect, the user can recognize the state of the unit compliant with the another standard, relatively easily, which is extremely useful in practice.

Examples

An example of the relay apparatus of the present invention will be explained with reference to the drawings.

Figure 1:
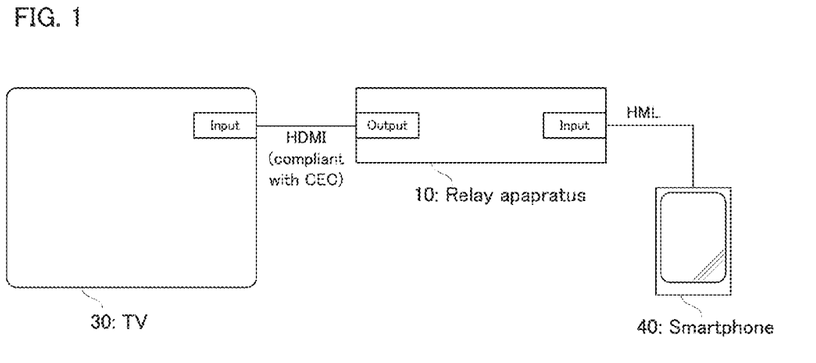
FIG. 1 is a conceptual diagram illustrating an entire configuration of a system in an example.

In the example, as illustrated in FIG. 1, a relay apparatus 10 is connected to an input terminal (Input) of a television 30 via a HDMI cable. A smartphone 40 is connected to an input terminal (Input) of the relay apparatus 10 via a MHL cable. As the relay apparatus 10, for example, a media player provided with a MHL input terminal, or the like can be applied.

Figure 2:
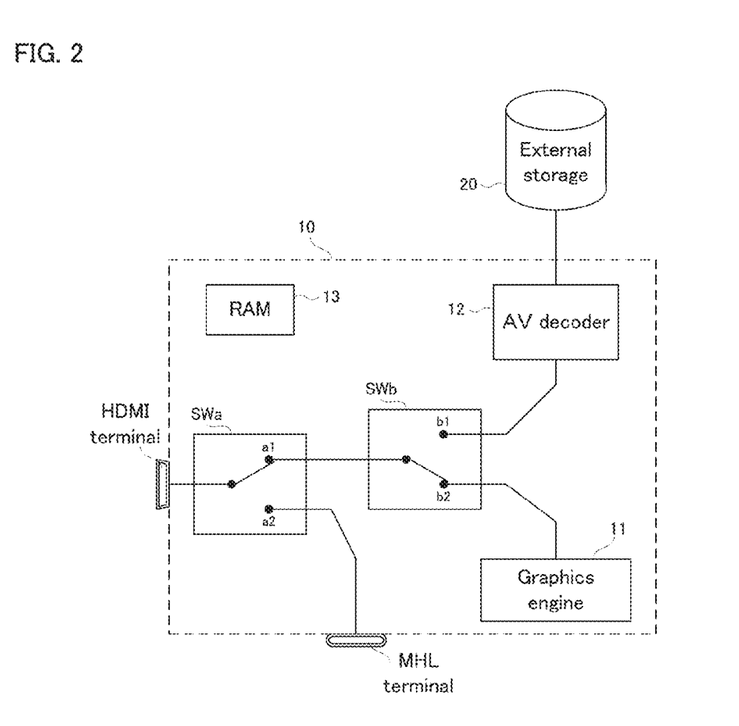
FIG. 2 is a block diagram illustrating a main configuration of a relay apparatus in the example.
Figure 3:
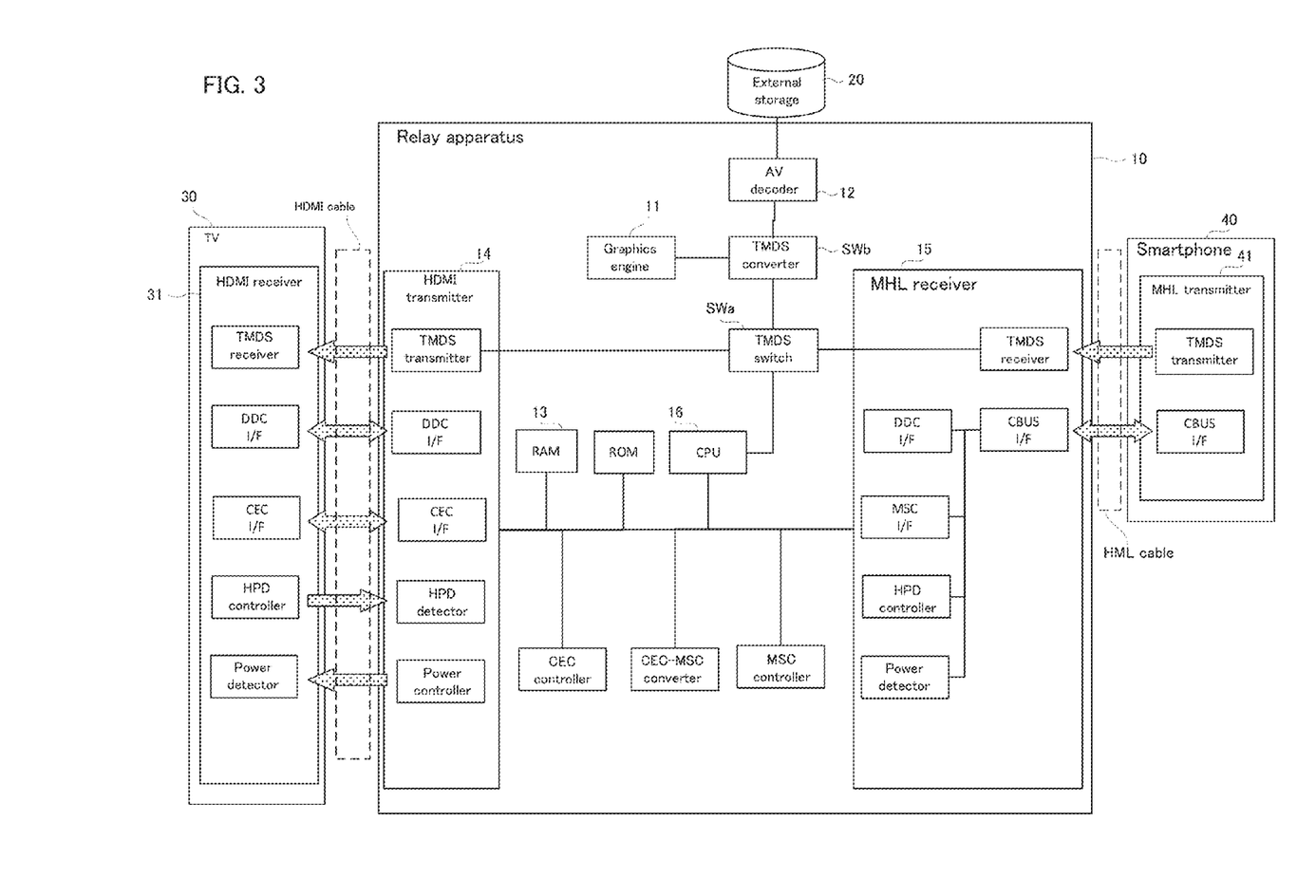
FIG. 3 is a block diagram illustrating a configuration of the relay apparatus in the example.

Next, a configuration of the relay apparatus 10 will be explained with reference to FIG. 2 and FIG. 3. FIG. 2 is a block diagram illustrating a main configuration of the relay apparatus in the example. FIG. 3 is a block diagram illustrating a configuration of the relay apparatus in the example.

In FIG. 2, the relay apparatus 10 is provided with a graphics engine 11, an AV decoder 12, a RAM 13, switches SWa and SWb, a HDMI terminal, and a MHL terminal. The AV decoder 12 is electrically connected to an external storage 20 such as, for example, an external hard disk drive.

If a terminal a1 is selected in the switch SWa and a terminal b2 is selected in the switch SWb, a signal outputted from the graphics engine 11 is outputted to the HDMI terminal. If the terminal a1 is selected in the switch SWa and a terminal b1 is selected in the switch SWb, a signal outputted from the AV decoder 12 is outputted to the HDMI terminal. If a terminal a2 is selected in the switch SWa, a signal inputted via the MHL terminal is outputted to the HDMI terminal.

The relay apparatus 10, as illustrated in FIG. 3, is further provided with a HDMI transmitter 14, a MHL receiver 15, a CPU 16 and the like. If the relay apparatus 10 and the television 30 are connected to each other by inserting the HDMI cable in the HDMI terminal, a signal is transmitted and received between the HDMI transmitter 14 of the relay apparatus 10 and a HDMI receiver 31 of the television 30. Moreover, if the relay apparatus 10 and the smartphone 40 are connected to each other by inserting the MHL cable in the MHL terminal, a signal is transmitted and received between the MHL receiver 15 of the relay apparatus 10 and a MHL transmitter 41 of the smartphone 40.

The "switch SWa" and the switch "SWb" correspond to a "TMDC switch" and a "TMDC converter" in FIG. 3, respectively. Each of the switches SWa and SWb is controlled by the CPU 16.

The "external storage 20", the "television 30", the "smartphone 40", the "graphics engine 11", the "HDMI transmitter 14", the "MHL receiver 14" and the "CPU 16" in the example are one example of the "storage apparatus", the "output apparatus", the "unit compliant with another standard", the "image output unit", the "first signal transmitting device", the "second signal transmitting device" and the "control unit" of the present invention, respectively. The "switch SWa" and the switch "SWb" in the example are one example of the "switch" of the present invention.

Next, the operation of the relay apparatus 10 as configured above will be explained with reference to FIG. 4 to FIG. 8.

Figure 4:
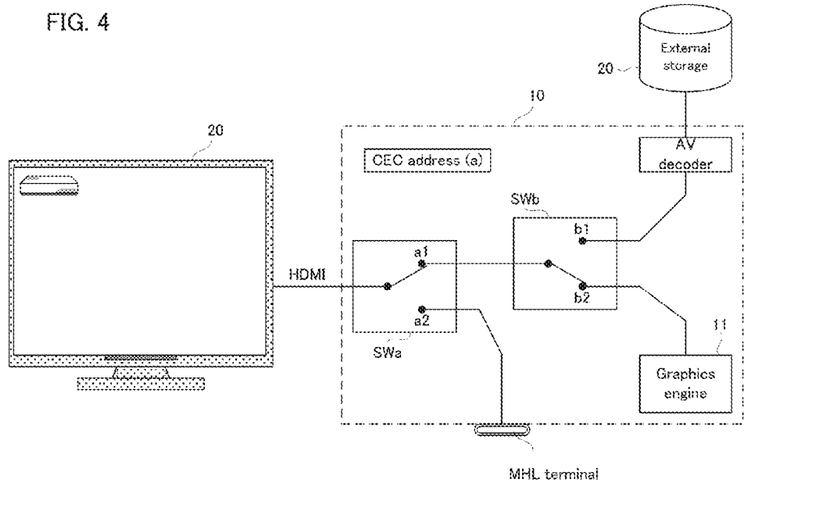
FIG. 4 is a conceptual diagram illustrating one example of the operation of the relay apparatus in the example.

(i) If the relay apparatus 10 is connected to the television 30 via the HDMI cable, the CPU 16, which is one example of the "obtaining unit" of the present invention, obtains a CEC address (a) which is a CEC address of the relay apparatus 10, and stores it, for example, in the RAM 13 (refer to FIG. 4). Various known aspects can be applied to a method of assigning the CEC address, and an explanation of the details is thus omitted.

In this case, the CPU 16 controls each of the switches SWa and SWb such that the terminal a1 is selected in the switch SWa and the terminal b2 is selected in the switch SWb (refer to FIG. 4). As a result, the signal outputted from the graphics engine 11 (which is typically a signal associated with a still image) is converted to a TMDS signal on a TMDS converter (refer to FIG. 3). The converted TMDS signal is outputted to the television 30 via a TMDS switch and the HDMI transmitter 14 (Refer to FIG. 3).

At this time, an icon indicating the relay apparatus 10 is displayed on a screen of the television 30 (refer to FIG. 4), and a user thus can recognize that the relay apparatus 10 can be used.

(ii) If the user operates, for example, a remote controller corresponding to the television 30 to give an instruction for reproducing video content stored in the external storage 20, the television 30 transmits CEC packets including the CEC address (a) and a command ("reproduction" herein) to the relay apparatus 10. In the relay apparatus 10 which receives the CEC packets, the CPU 16 controls each of the switches SWa and SWb such that the terminal a1 is selected in the switch SWa and the terminal b1 is selected in the switch SWb (refer to FIG. 5).

As a result, content data outputted from the external storage 20 is decoded to a video signal and an audio signal on the AV decoder 12, and the decoded video signal and the decoded audio signal are converted to the TMDS signals on the TMDS converter. The converted TMDS signals are outputted to the television 30 via the TMDS switch and the HDMI transmitter 14 (refer to FIG. 3).

Figure 5:
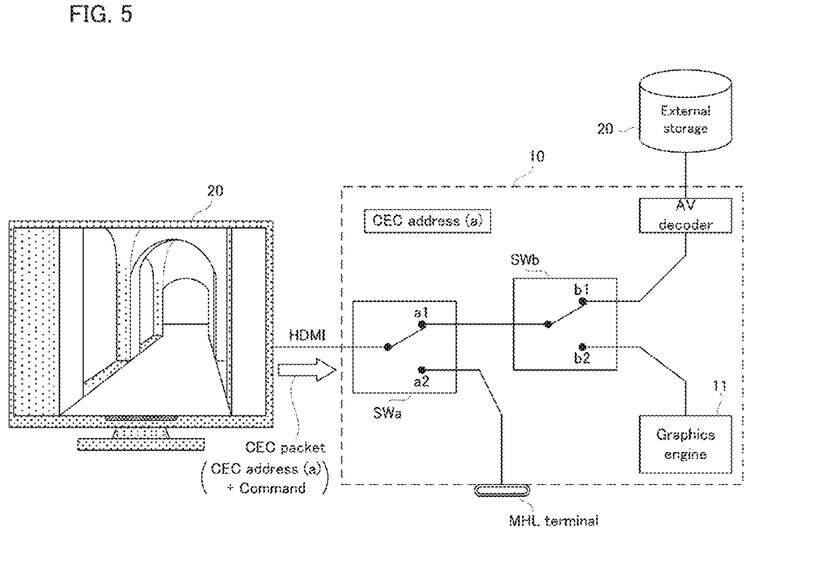
FIG. 5 is a conceptual diagram illustrating another example of the operation of the relay apparatus in the example.

At this time, the relay apparatus 10 issues an "Active Source" including the CEC address associated with the relay apparatus 10 (i.e. the CEC address (a)), to the television 30.

Figure 6:
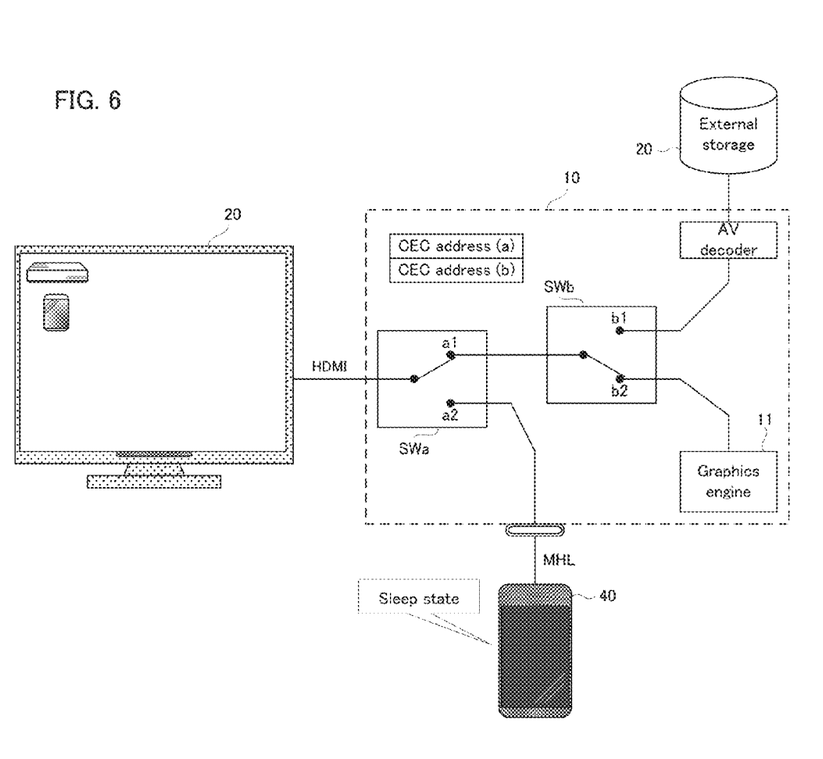
FIG. 6 is a conceptual diagram illustrating another example of the operation of the relay apparatus in the example.

(iii) If the relay apparatus 10 is connected to the smartphone 40 via the MHL cable, the CPU obtains a CEC address (b) which is a CEC address associated with the smartphone 40, and stores it, for example, in the RAM 13 (refer to FIG. 6).

In FIG. 6, the smartphone 40 is in a sleep state (i.e. standby state), and the CPU 16 thus controls each of the switches SWa and SWb such that the terminal a1 is selected in the switch SWa and the terminal b2 is selected in the switch SWb (refer to FIG. 6). At this time, an icon indicating the smartphone 40 is displayed on the screen of the television 30 (refer to FIG. 6).

If the smartphone 40 is in the start state, the CPU 16 may control the switch SWa such that the terminal a2 is selected in the switch SWa when the smartphone 40 is connected to the relay apparatus via the MHL cable. The aspect of the icon indicating the smartphone 40 may be changed according to the state of the smartphone 40.

Figure 7:
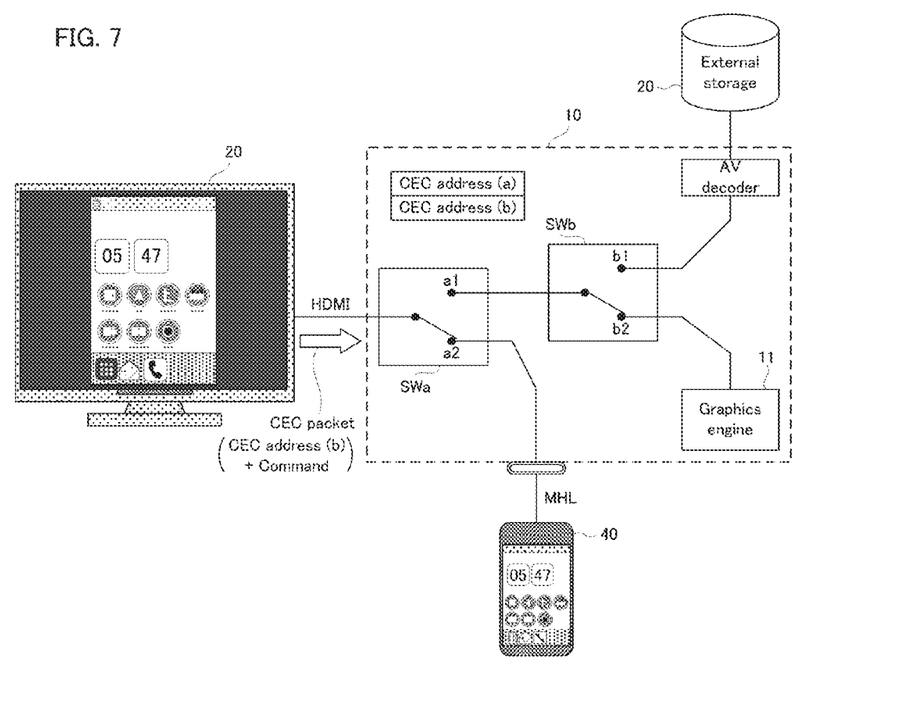
FIG. 7 is a conceptual diagram illustrating another example of the operation of the relay apparatus in the example.

(iv) If the user directly operates the smartphone 40 to change the smartphone 40 in the sleep state into the start state, the CPU 16 controls the switch SWa such that the terminal a2 is selected in the switch SWa (refer to FIG. 7).

As a result, a TMDS signal outputted from a TMDS transmitter of the smartphone 40 (refer to an inside of the "MHL transmitter 41" in FIG. 3) is outputted to the television 30 via a TMDS receiver of the relay apparatus 10 (refer to an inside of the "MHL receiver 15" in FIG. 3), a TMDS switch, and a TMDS transmitter (refer to an inside of the "HDMI transmitter 14" in FIG. 3).

At this time, the relay apparatus 10 issues an "Active Source" including the CEC address associated with the smartphone 40 (i.e. the CEC address (b)), to the television 30. On the screen of the television 30, there is displayed, for example, the same image as an image displayed on a screen of the smartphone 40 (refer to FIG. 7).

If the user operates, for example, the remote controller corresponding to the television 30 to change the smartphone 40 in the sleep state into the start state, the user selects the icon indicating the smartphone 40 and displayed on the screen of the television 30. At this time, a signal indicating the selection of the icon indicating the smartphone 40 is transmitted to the relay apparatus 10. In the condition that the signal indicating the selection of the icon indicating the smartphone 40 is received, the CPU 16 controls the switch SWa such that the terminal a2 is selected in the switch SWa. In addition, a signal which requires the TMDS signal is transmitted from the relay apparatus 10 to the smartphone 40. The smartphone 40 becomes in the start state in the condition that the signal which requires the TMDS signal is received.

If the user operates, for example, the remote controller corresponding to the television 30 to operate the smartphone 40 in the start state, the television 30 transmits, to the relay apparatus 10, CEC packets including the CEC address (b) and a command corresponding to an operation desired by the user. In the relay apparatus 10, the command included in the received CEC packets (or CEC command) is converted to a MSC command, for example, by the CPU 16, a CEC controller, a CEC-MSC converter, a MSC controller and the like (refer to FIG. 3). The converted MSC command is transmitted to the smartphone 40 through a MSC I/F (refer to an inside of the "MHL receiver 15" in FIG. 3). The smartphone 40 performs an operation according to the received MSC command.

As described above, in the example, the CEC command is converted to the MSC command on the relay apparatus 10. It is therefore possible to treat a unit noncompliant with the HDMI standard as a unit compliant with CEC.

(vi) If the smartphone 40 transfers from the start state to the sleep state, for example, by a timer function or the like, the smartphone 40 transmits to the relay apparatus 10 a signal indicating TMDS signal stop. The CPU 16 controls the switch SWa such that the terminal a1 is selected in the switch SWa in the condition that the signal indicating the TDMS signal stop is received (refer to FIG. 8).

Figure 8:
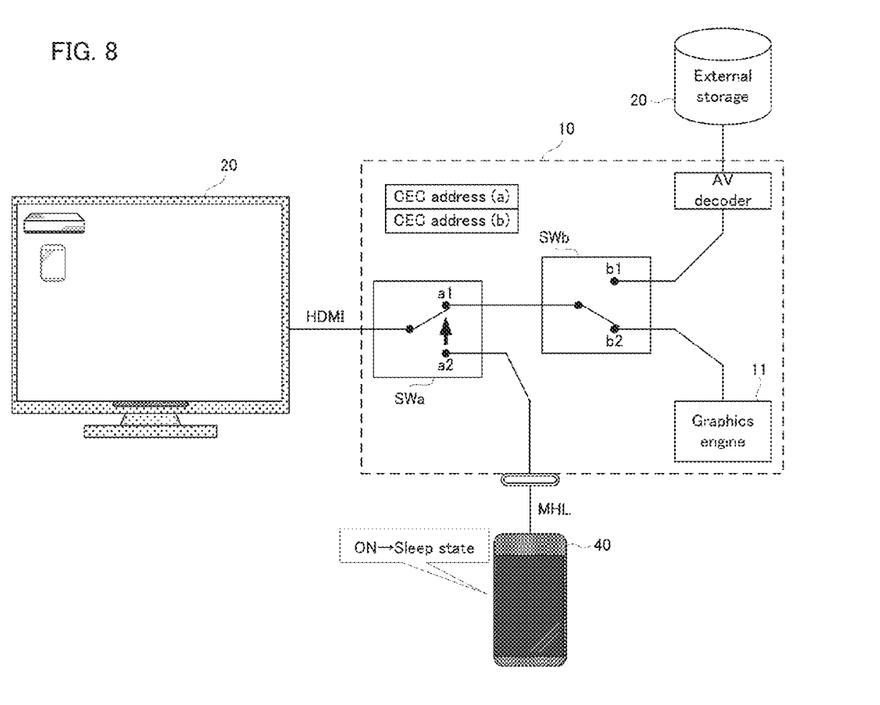
FIG. 8 is a conceptual diagram illustrating another example of the operation of the relay apparatus in the example.

At this time, the relay apparatus 30 issues the "Active Source" including the CEC address associated with the relay apparatus 10 (i.e. the CEC address (a)), to the television 30. On the screen of the television 30, there may be displayed an icon indicating that the smartphone 40 is in the sleep state.

As described above, in the example, even if the smartphone 40 connected to the relay apparatus 10 is in the sleep state, it is possible to prevent the no-signal state.

The present invention is not limited to the aforementioned embodiment and example, but various changes may be made, if desired, without departing from the essence or spirit of the invention which can be read from the claims and the entire specification. A relay apparatus which involves such changes is also intended to be within the technical scope of the present invention.

DESCRIPTION OF REFERENCE NUMERALS AND LETTERS 10 relay apparatus
11 graphics engine
12 AV decoder
13 RAM
14 HDMI transmitter
15 MHL receiver
16 CPU
20 external storage
30 television
31 HDMI receiver
40 smartphone
41 MHL transmitter
SWa, SWb switch

The invention claimed is:

1. A relay apparatus comprising:
a first signal transmitting device compliant with a high-definition multimedia interface (HDMI) standard for an interface;
a second signal transmitting device compliant with another standard which is different from the HDMI standard;
a storage apparatus;
an image output unit configured to output a predetermined image;
a switch configured to switch between a signal channel connecting the first signal transmitting device and the storage apparatus, a signal channel connecting the first signal transmitting device and the image output unit, and a signal channel connecting the first signal transmitting device and the second signal transmitting device;
a control unit configured to control the switch; and
an obtaining unit configured to obtain a first consumer electronic control (CEC) address which is a CEC address associated with said relay apparatus when said relay apparatus and an output apparatus are connected to each other via the first signal transmitting device,
wherein the control unit controls the switch to select the signal channel connecting the first signal transmitting device and the storage apparatus when the first CEC address outputted from the output apparatus and a reproduction command are received,
the obtaining unit obtains a second CEC address which is a CEC address associated with a unit compliant with the another standard when said relay apparatus is connected to the unit via the second signal transmitting device, and
the control unit controls the switch to select the signal channel connecting the first signal transmitting device and the second signal transmitting device when the unit is in a video output state, and controls the switch to select the signal channel connecting the first signal transmitting device and the image output unit when the unit is in a standby state.

2. The relay apparatus according to claim 1, further comprising a converting device configured to convert a received user command corresponding to an operation desired by a user such that the received command is compliant with the another standard when the second CEC address outputted from the output apparatus and the user command are received.

3. The relay apparatus according to claim 1, further comprising a starting device configured to set the unit in a start state when the unit is in the standby state and when the second CEC address outputted from the output apparatus and a user command corresponding to an operation desired by a user are received.

4. The relay apparatus according to claim 1, wherein the image output unit changes an icon displayed on a display unit of the output apparatus according to a state of the unit, when the signal channel connecting the first signal transmitting device and the image output unit is selected by the switch.

* * * * *